Jan. 31, 1967 M. DOSEDLA ET AL 3,300,895
APPARATUS FOR THE SOILLESS CULTIVATION OF SEEDLINGS AND PLANTS
Filed Jan. 18, 1965 3 Sheets-Sheet 3

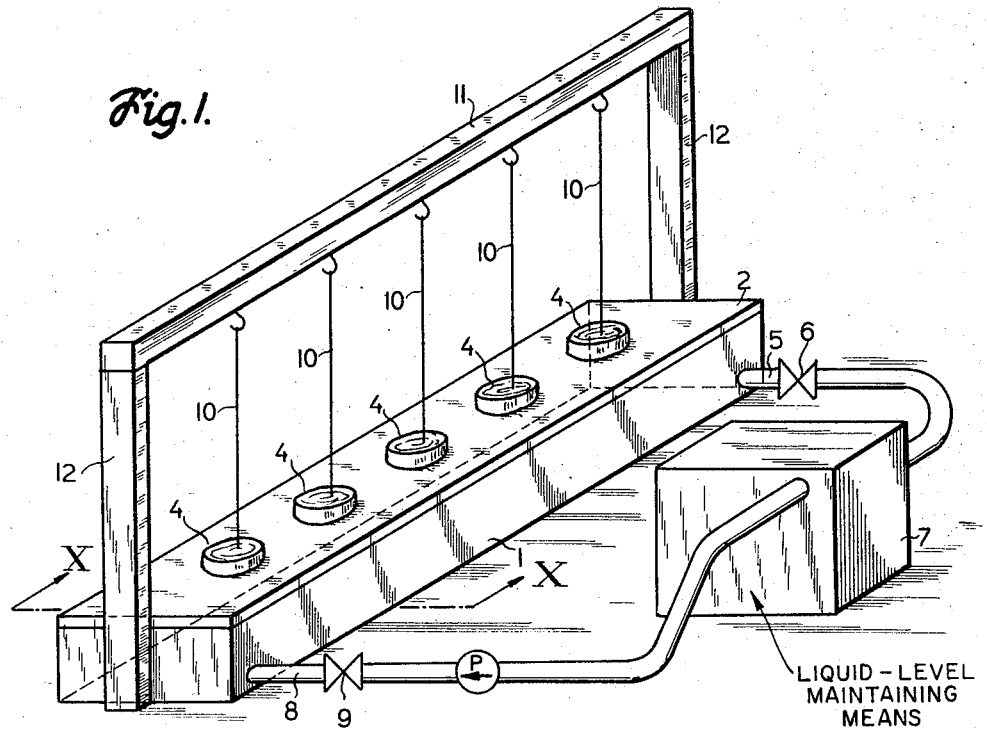
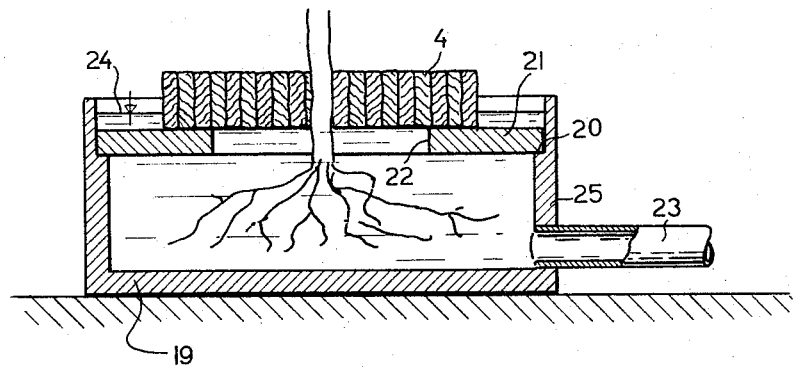

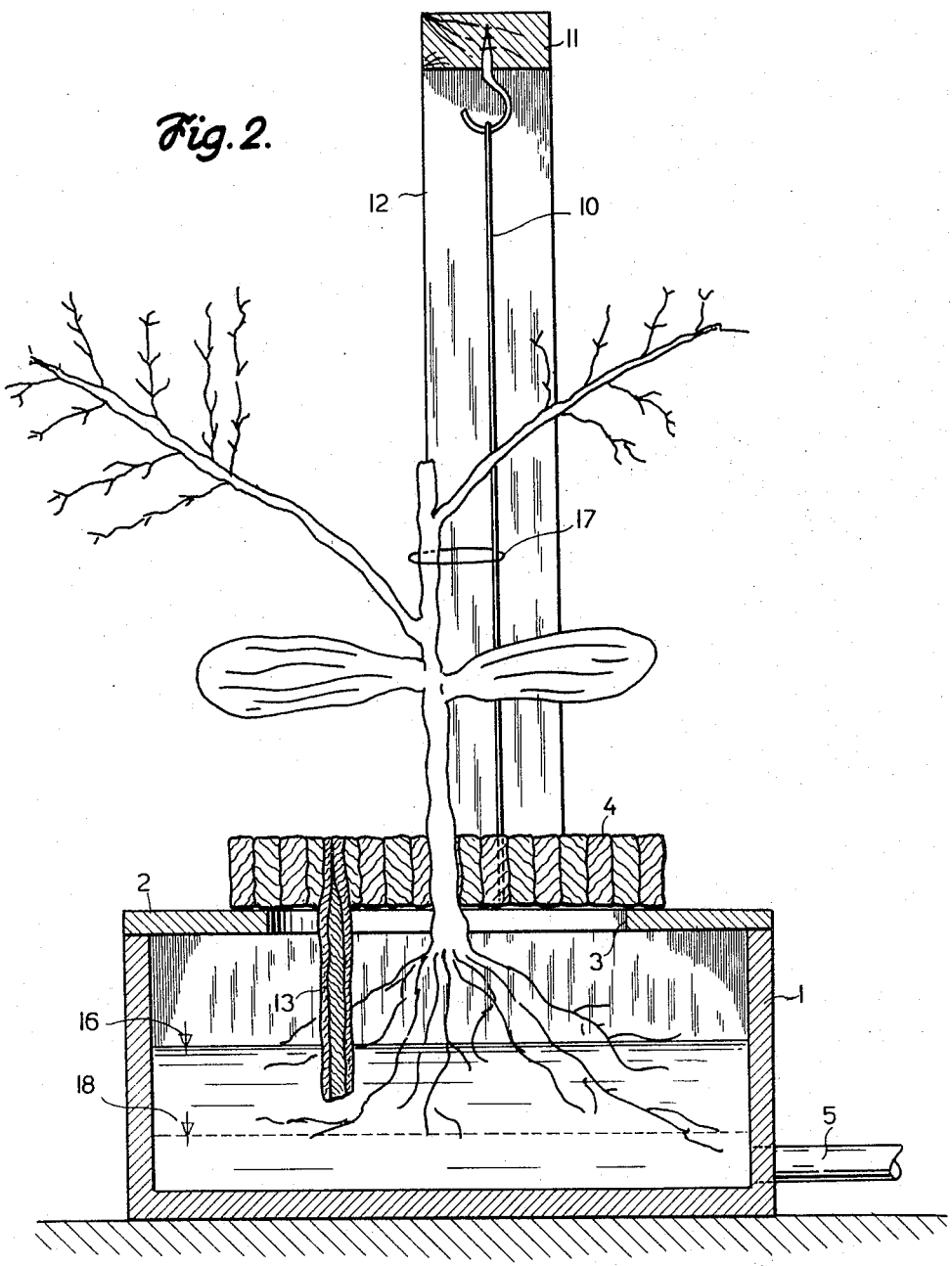

INVENTORS
Miroslav Dosedla
Ivo Povlica
BY
Michael J. Striker

United States Patent Office 3,300,895
Patented Jan. 31, 1967

3,300,895
APPARATUS FOR THE SOILLESS CULTIVATION OF SEEDLINGS AND PLANTS
Miroslav Dosedla, Decin, and Ivo Pavlica, Prague, Czechoslovakia, assignors to Roudnicke Strojirny a Slevarny, narodni, podnik, Roudnice nad Labem, Czechoslovakia
Filed Jan. 18, 1965, Ser. No. 426,199
Claims priority, application Czechoslovakia, Jan. 29, 1964, 513/64
4 Claims. (Cl. 47—1.2)

The present invention relates to an apparatus for the soilless cultivation of seedlings and plants and more particularly to the means by which an advantageous preliminary cultivation of seedlings and plants is achieved.

The conventional method of preliminary cultivation has heretofore been effected by planting the seeds into ordinary soil or on grids having small interstices and covered with a layer of soil. After germination the seedlings are either potted or pricked out. When the seedlings have reached the stage, in which they are suited for planting out, the soil has to be removed from their roots, which operation is performed usually by flotation. If grids are used for the preliminary cultivation of seedlings, it is a common experience that the roots, which have grown through the interstices in the grid, become entangled to such a degree, that their separation for the purpose of planting them out in the open is a tedious and delicate operation. Moreover, the use of a grid does not appear advantageous, as it does not provide any supporting or holding means for the plant during its growth. The above mentioned floating operation is connected with considerable expenses, as it requires skillful manual handling, the more so as the soil particles adhere firmly to the roots. Due to the fact that the plants are in intimate contact with the soil, the possibility of their infection with noxious bacteria cannot be disregarded and, in addition, they are apt to become the carriers of harmful diseases. The heretofore employed methods of preliminary cultivation are connected with further considerable costs, when the plants are transplanted to the cultivation soil, which may consist for example of crushed basalt, tuff, sand, crushed bricks and the like.

Thus the preparation of seeds for preliminary cultivation and the treatment of seedlings is carried out generally in an uneconomical manner unsuited for mechanisation, let alone automation. The conventional method of preliminary cultivation, either in soil or in hydroponic media, requires a great deal of manual labor, which means that a high percentage of the total costs of cultivation has to be paid out in wages.

It is therefore an object of the present invention to overcome the above mentioned difficulties and disadvantages.

It is another object of the present invention to provide means for hydroponic plant cultivation under strictly hygienic conditions.

Yet another object of the present invention is to provide means for hydroponic plant cultivation ensuring favorable conditions for the growth of the plant and darkness for the development of the root systems.

It is yet a further object of the present invention to provide means for hydroponic plant cultivation which are simple and efficient and which may be operated in a particularly simple and economical manner.

Other objects and advantages of the present invention will become apparent from a further reading of the description and of the appended claims.

With the above and other objects in view, as will more fully appear in the specification, the invention contemplates an apparatus for the soilless cultivation of seedlings and plants, comprising, in combination, a container including a top covering formed with at least one opening therein, supply means for introducing liquid into the container and for maintaining a predetermined upper level of liquid therein, at least one pad means of resilient liquid-absorbing material formed with interstices and adapted to receive the seed of a plant, supported by the top covering and extending over said opening therein, the pad means including a lower portion of absorbent material extending below the predetermined level in the container and an upper portion contiguous with the lower portion and located above the predetermined level, whereby upon filling of the container with liquid up to the predetermined level, the entire pad means will be moistened and thereby adapted to supply liquid to a plant seed received by the pad means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view of an embodiment of the invention, showing the overall arrangement of the new apparatus;

FIG. 2 is a cross-sectional view on an enlarged scale taken along line X—X of FIG. 1, showing the main parts of the apparatus holding a growing plant;

FIG. 3 is a partial cross-sectional view of a modified apparatus according to the present invention;

Figure 4:
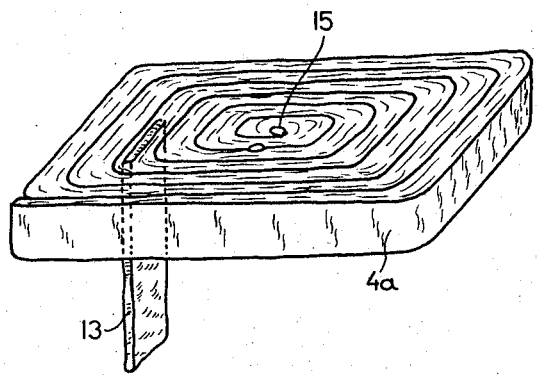
FIG. 4 is a perspective view of another embodiment in which a cultivation pad, is equipped with means for supplying a liquid thereto and thus to the seeds located in the pad.

Referring first to FIGS. 1 and 2, the apparatus comprises a container 1 of any required shape or dimensions, the particular container shown in the drawing being of rectangular shape, resembling an elongated box covered at its top with a lid or supporting member 2. It will be understood that any required number of such boxes or containers juxtaposed in axial as well as in transverse direction or a large box divided by partitions into compartments, may be used, as will be readily apparent to those skilled in the art.

The lid 2 is provided with a number of openings 3 of circular, rectangular or any other shape. Placed on top of each opening 3 is a pad 4 consisting preferably of cotton wool or peat and produced in a manner which will be described later. The pad 4 serves for accommodating one or more seeds of the plant, which has to be grown in the apparatus according to the invention.

The container 1 holds a supply of water or nutritious liquid, as the case may be, the liquid being supplied to the container through a pipe 5 over a control valve 6 from a supply source marked generally with the reference numeral 7. The supply source may contain a pump (not shown) adapted for withdrawing the liquid from the container 1 through a pipeline 8 and control valve 9 to a storage container (not shown) accommodated in the supply means 7 and discharging the liquid to the container 1 through said pipe 5. A conventional overflow device (not shown) may be provided in order to maintain a predetermined upper level of the liquid in the container.

In a preferred embodiment of the invention supporting or holding means for the growing plant are provided adjacent each opening 3. In the apparatus shown in FIGS. 1 and 2, lengths of wires 10 are used for this purpose, each wire being anchored with its lower end in the lid 2, while its top end is fixed to an upper beam 11 or any similar structure. As apparent from FIG. 1, the beam 11 is supported on standards 12 fixed to the end walls of the container 1. This arrangement has been chosen for the purpose of illustration only and any other suitable holding or supporting means for the growing plant may be used instead, such as rods, nets or the like. The pad 4 may consist of celluolse cotton wool, whose layers are oriented in vertical direction, as shown in FIG. 2.

FIG. 4 shows a still further modification of the cotton wool pad, indicated in this case by reference numeral 4a, in which a capillary member 13 is fixed between two adjacent layers constituting the pad. The capillary member may be a wick or a piece of cotton wool or any other material suited to transfer liquid by capillary action from a lower to a higher level.

Figure 5:
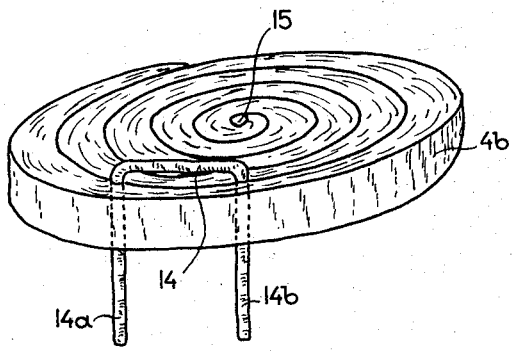
FIG. 5 is a perspective view of a further modification of the pad.

FIG. 5 shows a similar embodiment of a pad, indicated by reference numeral 4b, wherein one capillary member 14 with two branches 14a and 14b is shown as secured between the layers of the pad. It is obvious that instead of one capillary member any required number thereof may be used.

As shown in FIG. 2 of the drawings, a pad 4 with a capillary member 13 is placed over each aperture 3 provided in the lid 2, in such a way that the capillary member 13 shall project downward into the interior space of the container 1.

One or more seeds 15 of the plant to be grown are pressed from above into the cotton wool pad 4 and nutrient fluid or water, as the case may be, is admitted through the pipe 5 into the container 1, until it reaches the level 16. As apparent from FIG. 2, the capillary member extends below the liquid level 16 in the container 1, the liquid rising by capillary action through the member 13 upwards into the pad 4, which is thus permanently wetted with liquid from the container 1. If necessary, the pad may initially or at any suitable time intervals be wetted additionally also from above, as required by the particular type of plant to be grown.

In the initial stages of cultivation, the container 1 is first filled with water up to the level 16. When the seed has germinated, the water is replaced by a nutrient solution ensuring further growth of the seedling. Due to the layers of cotton wool being oriented in vertical direction, the roots of the young plant can easily grow through the pad into the nutrient solution, while the upper part of the plant may grow unobstructed and, in order to support it, the stalk may be fixed with eyelets or similar member 17 to the wires 10.

The cottom wool pad ensures hygienic conditions during germination and further growth of the plant, as the wound or folded cotton wool layers provide a proper seal against penetration of undesirable matter to the seeds and into the solution. In addition, they close the opening 3 so that the roots of the plant are kept in the required darkness, which favors their development.

The liquid level 16 may reach any desired height, it being however advisable to start with a higher level and, after the growth of the plant has reached a certain stage, to lower the level, as indicated by dotted lines marked 18 in FIG. 2, in order to allow free access of air to the roots. The plant thus grows with a portion thereof in the cotton wool pad during its entire period of vegetation.

FIG. 3 shows a modified embodiment of the new apparatus, in which a pad 4 without any capillary member is used. A container 19, which may be similar to the container 1 shown in FIG. 1, is provided with side walls 25 havinng shoulders 20, on which a support member or plate 21 is placed. The latter is provided with a number of openings 22, which may be similar to those provided in the lid 2 according to FIG. 1 and may be of circular, rectangular or any other shape. Pads 4 with inserted seeds are placed over the opening 22. Liquid is supplied to the container 19 through pipe 23, until it reaches level 24 above the upper surface of the support plate 21, so that the lower part of the pad is immersed in the liquid. In this way the capillary members, as used according to FIG. 2, may be dispensed with. After the seed has germinated, the liquid level may be lowered as required and nutrient solution supplied to the pad 4 by periodically raising and lowering the level, in order to wet the pad at predetermined periods.

It will be understood that each of the elements described above, or two or more together, may also find a useful application in other types of hydroponic apparatus differing from the types described above.

While the invention has been illustrated and described as embodied in an apparatus for the soilless cultivation of seeds, seedlings and plants, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalent of the following claims.

What is claimed as new and desired to be secured by Letters Patent is:

1. A plant growing arrangement, comprising, in combination, a liquid-containing container having a top wall with an opening therein and supporting means around said opening located in a horizontal plane; and a plant supporting pad supported by the supproting means above said opening and composed of a plurality of upstanding adjacent resilient strip portions of absorbent material so as to form vertical interstices between any pair of adjacent strips thus permitting the roots of a plant to extend downwardly within any of said vertical interstices between any pair of adjacent resilient strips and into said liquid-containing container while resiliently supported by those adjacent resilient strips which form those interstices or interstices through which said roots of said plant extend.

2. A plant growing arrangement wherein said resilient strip portions of absorbent material consist of cotton wool.

3. A plant growing arrangement according to claim 1, wherein said resilient strip portions are formed by a continuous wound strip of absorbent material.

4. A plant growing arrangement according to claim 1, including means securing said resilient strip portions to each other.

References Cited by the Examiner
UNITED STATES PATENTS

| | | | |
|---|---|---|---|
| 979,175 | 12/1910 | Lapham | 47—14 |
| 1,172,787 | 2/1916 | Gray | 47—14 |
| 1,207,013 | 12/1916 | Floren | 47—14 |
| 1,279,310 | 9/1918 | Esslinger | 47—15 |
| 2,183,970 | 12/1939 | Meissl | 47—38.1 |
| 3,199,250 | 8/1965 | Sawyer | 47—1.2 |

ABRAHAM G. STONE, *Primary Examiner.*
ROBERT E. BAGWILL, *Examiner.*